United States Patent
Gamble et al.

(10) Patent No.: US 6,249,432 B1
(45) Date of Patent: Jun. 19, 2001

(54) VIBRATION DAMPENING SYSTEM FOR REMOVABLE HARD DISK DRIVE CARRIERS

(75) Inventors: Eric T. Gamble, Raleigh; James R. Drake, Burlington; Joaquin F. Pacheco, Apex, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/662,252

(22) Filed: Sep. 14, 2000

Related U.S. Application Data

(63) Continuation of application No. 09/042,037, filed on Mar. 13, 1998.

(51) Int. Cl.[7] .................................................. G06F 1/16
(52) U.S. Cl. ........................ 361/685; 248/618; 248/638; 360/137; 369/75.1; 361/727
(58) Field of Search ................... 361/679–686; 369/76, 77.1, 78, 75.1, 77.2, 79, 80, 81, 82; 248/635, 634, 636, 638, 618; 360/137, 137 D

(56) References Cited

U.S. PATENT DOCUMENTS

| | | | |
|---|---|---|---|
| 4,713,714 | * 12/1987 | Gatti et al. | 361/685 |
| 4,896,777 | * 1/1990 | Lewis | 361/685 |
| 4,899,254 | * 2/1990 | Ferchau et al. | 361/685 |
| 5,402,308 | * 3/1995 | Koyanagi et al. | 361/685 |
| 5,463,527 | * 10/1995 | Hager et al. | 361/685 |
| 5,654,875 | * 8/1997 | Lawson | 361/685 |
| 5,777,845 | * 7/1998 | Krum et al. | 361/685 |
| 5,784,351 | * 7/1998 | Takagi | 369/77.2 |
| 5,837,934 | * 11/1998 | Valavanis et al. | 174/52.1 |
| 5,995,365 | * 11/1999 | Broder et al. | 361/685 |
| 6,069,789 | * 5/2000 | Jung | 361/685 |
| 6,094,342 | * 7/2000 | Dague et al. | 361/685 |
| 6,154,360 | * 11/2000 | Kaczeus, Sr. et al. | 361/685 |

* cited by examiner

*Primary Examiner*—Leo P. Picard
*Assistant Examiner*—Lisa Lea-Edmonds
(74) *Attorney, Agent, or Firm*—Bracewell & Patterson, LLP

(57) ABSTRACT

A "hot-pluggable" hard disk drive is mounted in a removable hard disk drive tray. The hard disk drive tray has a vibration dampening system for reducing vibration between the hard disk drive, the hard disk drive tray, and a hard disk drive docking bay located within a computer system. The vibration dampening system has three primary components. The first component is a strip of polymeric material located between an end of the hard disk drive tray and the docking bay. The second component of the vibration dampening system is a set of polymeric strips located between an inner surface of the tray and the hard disk drive. The third component of the vibration dampening system is a set of spring assemblies. Each spring assembly is located between the sides of the tray and the docking bay.

22 Claims, 3 Drawing Sheets

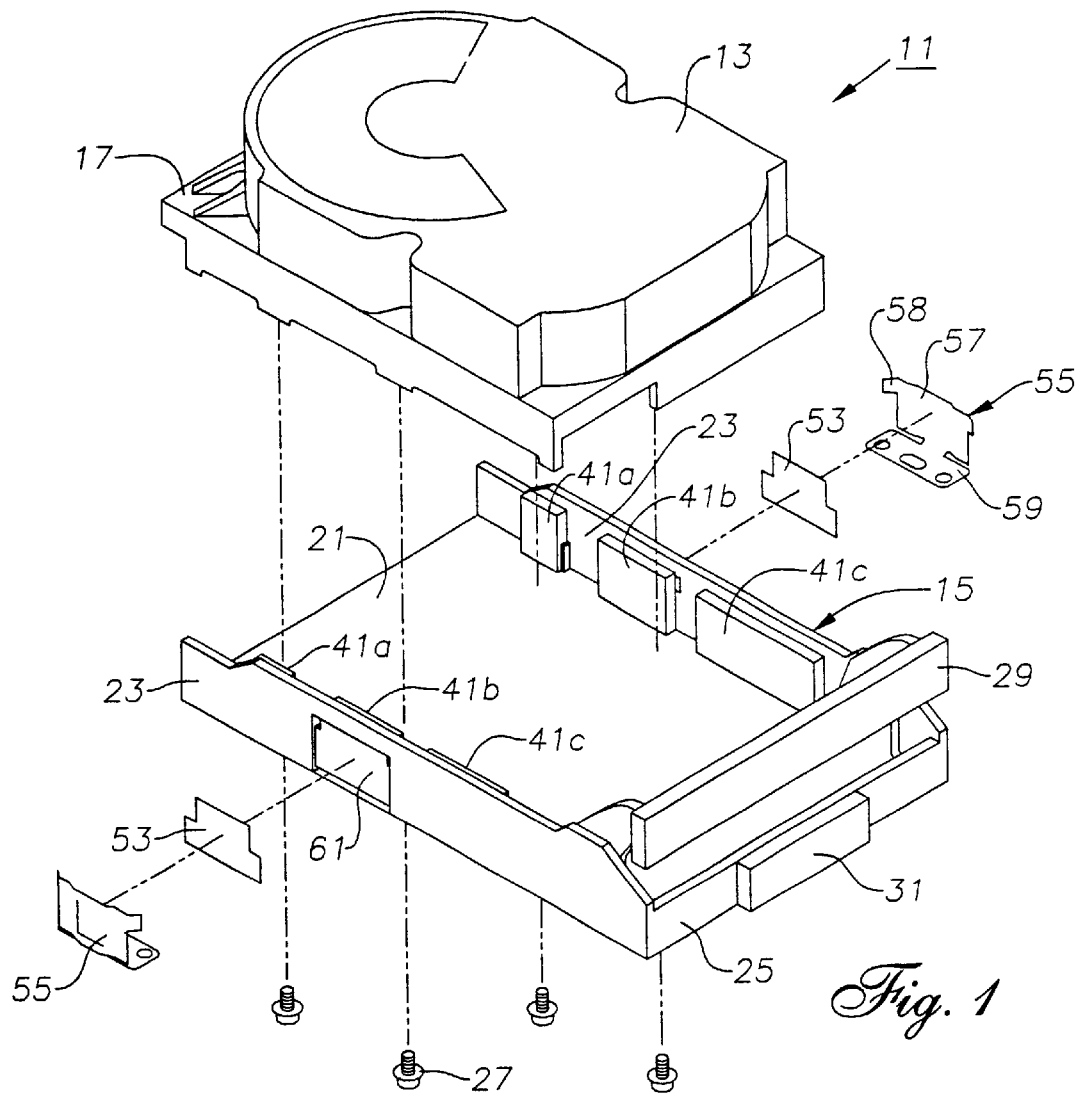
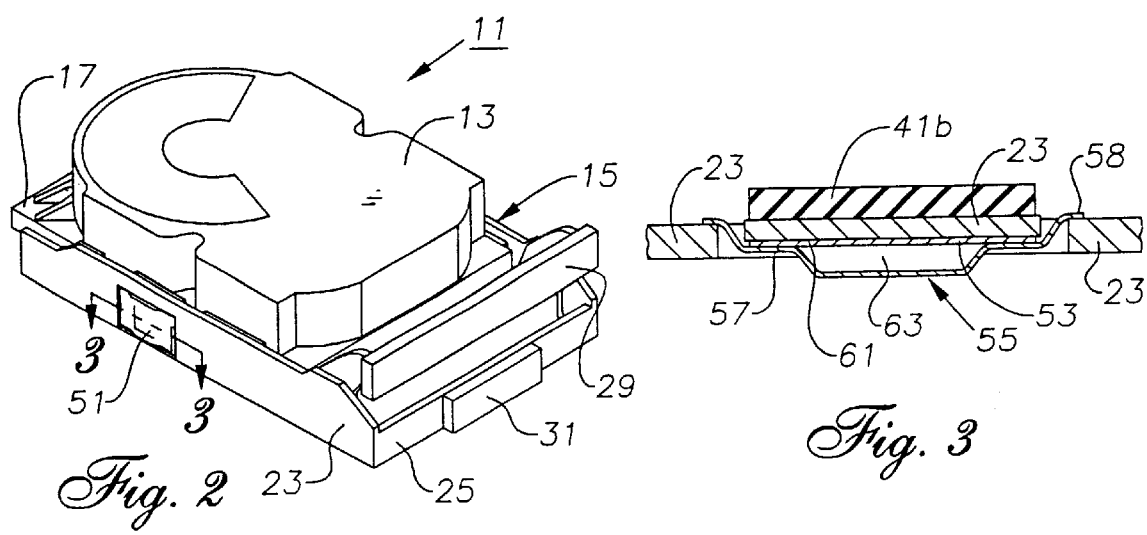

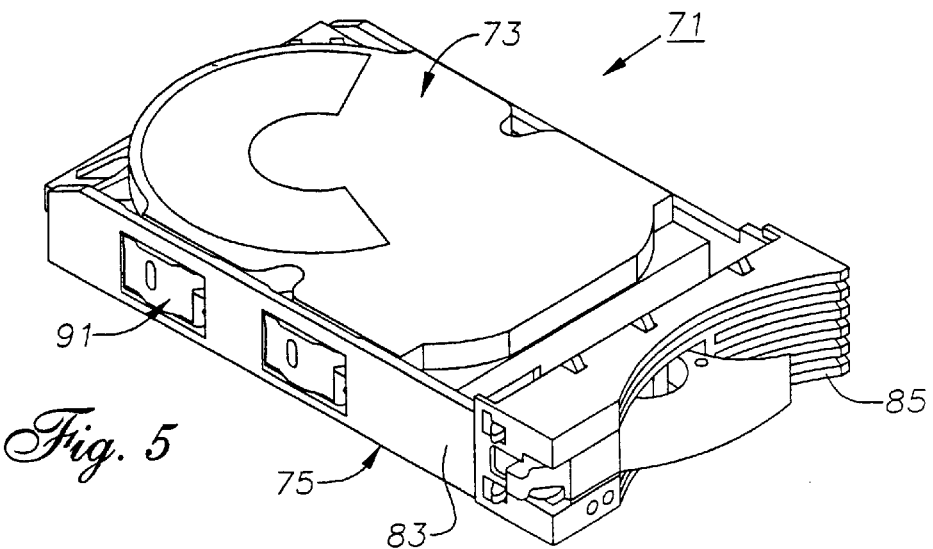
Fig. 5
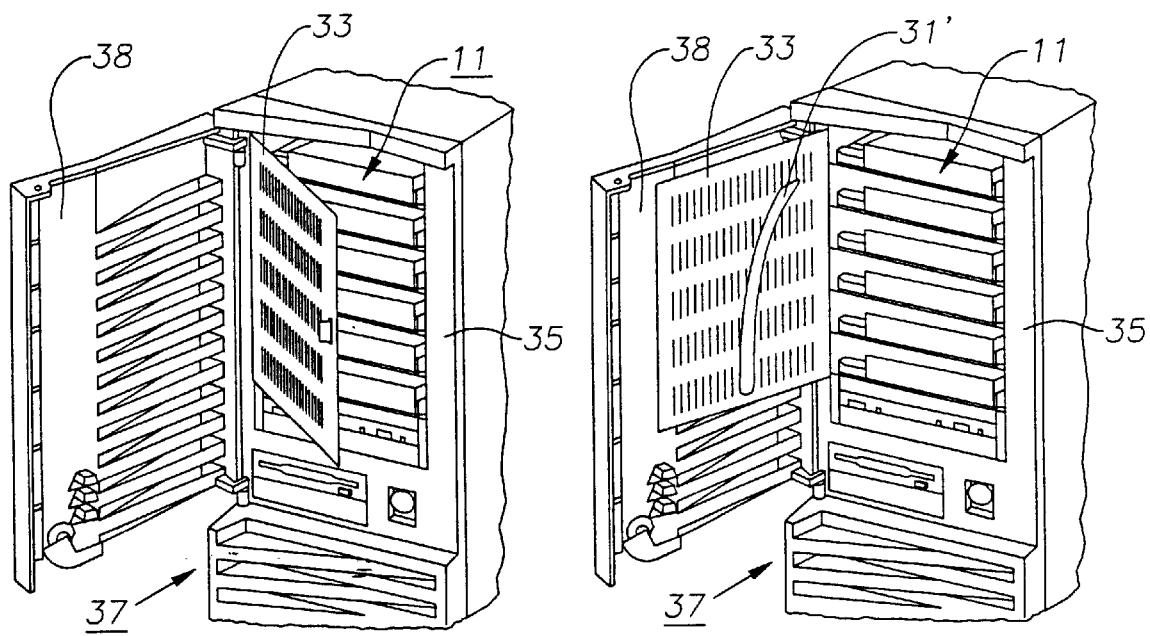
Fig. 6
Fig. 7

VIBRATION DAMPENING SYSTEM FOR REMOVABLE HARD DISK DRIVE CARRIERS

This is a Continuation of application Ser. No. 09/042,037, filed Mar. 13, 1998, currently pending.

TECHNICAL FIELD

This invention relates in general to removable hard disk drives and in particular to a vibration dampening system for removable hard disk drive carriers.

BACKGROUND ART

"Hot-pluggable" hard disk drives (HDD) are removable during operation in a computer or peripheral systems environment An HDD is typically mounted in a hard disk drive carrier prior to installation in a system An HDD carrier is a frame-like structure which attaches to the HDD to assist in its insertion into or removal from the system. HDD carriers also protect the HDD when it is outside of the systems environment HDD carriers are typically constructed out of metal and/or polymeric materials.

The system usually contains several HDD's, each of which may be readily interchangeable in the system. The HDD's are mounted in an HDD bay or chassis located within a system enclosure. During operation, the HDD's create vibration as they rotate. The vibration can become excessive, particularly when adjacent HDD's are operated simultaneously. Moreover, as HDD technology progresses to faster rotational speeds and cost-reduction architectures, the vibration problems are exacerbated.

Excessive vibration may lead to decreased HDD performance such as recoverable and non-recoverable write inhibits, increased seek times, and increased read and write access times. Excessive vibration may also cause premature HDD failures that are not repairable. Examples include mechanically-damaged platters and read/write heads, mechanical wear on moving HDD components, and data error defects that cannot be corrected through the use of software tools. Thus, a need exists to reduce systems vibration caused by removable HDD's.

DISCLOSURE OF THE INVENTION

A "hot-pluggable" hard disk drive is mounted in a removable hard disk drive tray. The hard disk drive tray has a vibration dampening system for reducing vibration between the hard disk drive, the hard disk drive tray, and a hard disk drive docking bay located within a computer system The vibration dampening system has three primary components. The first component is a strip of polymeric material located between an end of the hard disk drive tray and the docking bay. The second component of the vibration dampening system is a set of polymeric strips located between an inner surface of the tray and the hard disk drive. The third component of the vibration dampening system is a set of spring assemblies. Each spring assembly is located between the sides of the tray and the docking bay.

BRIEF DESCRIPTION OF THE DRAWINGS

FIG. 1 is an exploded isometric view of a hard disk drive carrier constructed in accordance with the invention FIG. 2 is an isometric view of the hard disk drive carrier of FIG. 1.

FIG. 3 is an enlarged sectional side view of a side wall and damper of the hard disk drive carrier of FIG. 1 taken along the line 3—3 of FIG. 2.

FIG. 5 is an isometric view of the hard disk drive carrier of FIG. 4.

FIG. 6 is an isometric view of a hard disk drive bay loaded with a plurality of the hard disk drive carriers of FIGS. 1 or 4 with the bay door partially opened.

FIG. 7 is an isometric view of the hard disk drive bay of FIG. 6 with the bay door completely opened.

BEST MODE FOR CARRYING OUT THE INVENTION

Figure 4:
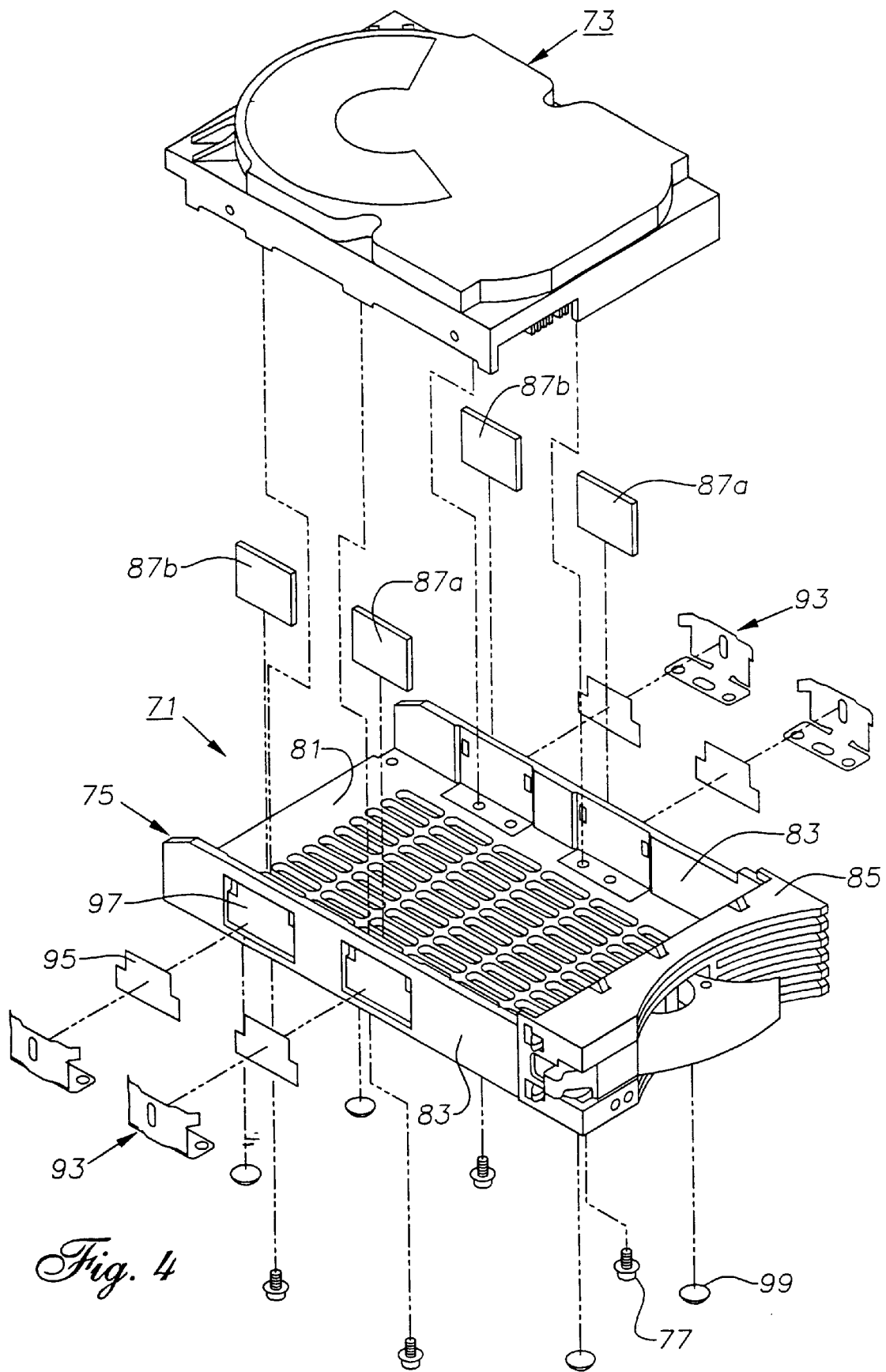
FIG. 4 is an exploded isometric view of an alternate embodiment of the hard disk drive carrier of FIG. 1.

Referring to FIGS. 1 and 2, a hard disk drive assembly 11 having a removable or "hot-pluggable" hard disk drive 13 and a first embodiment of a removable hard disk drive carrier 15 is shown. Hard disk drive 13 has an electrical connector (not shown) on a forward end 17 for connecting to a systems environment connector (not shown). Carrier 15 comprises a generally rectangular frame-like structure or tray having a planar base 21, a pair of side walls 23 extending perpendicularly upward from base 21, and a rearward end 25 with a handle 29. Carrier 15 has an open forward end which allows the connector on hard disk drive 13 to engage the systems environment connector. Hard disk drive 13 is rigidly mounted to carrier 15 with four screws 27 or other suitable fasteners.

Carrier 15 also comprises a vibration dampening system having three primary components. The first component is an external end absorber 31 which is bonded or mounted to the rearward end 25 of each carrier 15. End absorbers 31 may be formed from short strips of polymeric material or a combination of polymeric materials with vibration and shock absorption properties. End absorbers 31 are designed to absorb vibration between individual hard disk drive assemblies 11 and the closure of the docking bay in the system environment. An alternative configuration and location for end absorbers 31 is shown in FIGS. 6 and 7. End absorber 31' is longer than end absorber 31 but is formed from the same material. End absorber 31' may be attached or bonded directly to the door 33 of the docking bay 35 in system 37 to collectively insulate vibration of hard disk drives assemblies 11 from one another and door 33 of system 37.

A second component of the vibration dampening system comprises a plurality of internal side absorbers 41. Side absorbers 41 are short, vibration-absorbing strips and may be formed from the same material as end absorbers 31. In the embodiment of FIGS. 1 and 2, each carrier 15 has three side absorbers 41a, 41b, 41c bonded or mounted to an inner surface of each side wall 23. The side absorbers 41 are cut to various lengths to better accommodate hard disk drive 13. When hard disk drive 11 is assembled, the dampening material is deflected to create an interference fit between hard disk drive 13 and carrier 15. The interference fit is created by encroaching on the hard disk drive form factor.

The third component of the vibration dampening system comprises a pair of spring assemblies 51. One spring assembly 51 is located on each side wall 23 of carrier 15. Each spring assembly 51 has a thin rectangular pad 53 and a spring 55. Pads 53 are formed from dampening material which is similar to the dampening materials described above. Springs 55 may comprise metal or conductive polymer materials. In either case, springs 55 may also act as an EMC and ESD ground interface between hard disk drive 13, carrier 15 and the docking bay of the system.

Each spring 55 has an absorption portion 57 and a mounting portion 59. As shown in FIGS. 1 and 3, pad 53 is sandwiched between each absorption portion 57 of spring 55 and a recess 61 on the outer surface of side wall 23. A small tab 58 on each end of absorption portion 57 snaps into slots in recess 61 to retain spring 55 and pad 53 in place. Each spring assembly 51 is located on the opposite side of side wall 23 as the middle side absorber 41b. Mounting portion 59 locates adjacent to base 21 of carrier 15 and is secured with a screw 27 to the lower side of base 21. If necessary, mounting portions 59 act as ESD contact points. When properly installed, a small space or gap 63 will be defined between a central portion of absorption portion 57 which protrudes a small distance away from side wall 23 and pad 53. Gap 63 allows the central portion of absorption portion 57 to deflect slightly relative to pad 53. Spring assemblies 51 are designed to act as a bridge or part of a bridge for physical contact between hard disk drive 13 or carrier 15 and the docking bay for the system Springs 55 and pads 53 either contact each other directly or they support common reaction force components within the assembly.

In operation, a plurality of hard disk drive assemblies 11 are assembled by fastening a hard disk drive 13 to each carrier 15 (FIG. 2). Side absorbers 41 eliminate mechanical lash and absorb vibration between hard disk drive 13 and carrier 15. With bay door 33 in the open position (FIG. 7), each assembly 11 is inserted into a slot in docking bay 35. Spring assemblies 51 contact the guide rails (not shown) in docking bay 35, thereby slightly depressing absorption portions 57 for additional vibration dampening With assemblies 11 filly installed, bay door 33 and the system enclosure door 38 are closed. End absorbers 31 (FIG. 2) or end absorber 31' (FIG. 7) further dampen vibration between the assemblies 11 and docking bay 35.

Referring to FIGS. 4 and 5, a hard disk assembly 71 having a removable hard disk drive 73 and a second embodiment of a removable hard disk drive carrier 75 is shown. Carrier 75 is similar to but slightly larger than carrier 15 and has a base 81, a pair of side walls 83 extending upward from base 81, and a disk actuator 85 on a rearward end. Hard disk drive 73 is rigidly mounted to carrier 75 with four screws 77 or other suitable fasteners.

Carrier 75 has a vibration dampening system with three primary components. The first component is a set of internal side absorbers 87. Side absorbers 87 are similar to side absorbers 41, described above and formed from the same material. Each carrier 75 has two side absorbers 87a, 87b which are mounted to an inner surface of each side wall 83. The dampening material of side absorbers 87 absorbs vibration between hard disk drive 73 and carrier 75.

The dampening system of carrier 75 also comprises four spring assemblies 91, two of which are on each side wall 73 of carrier 75. Spring assemblies 91 are identical to spring assemblies 51 and have a spring 93 and a pad 95. Each spring assembly 91 mounts in a recess 97 on an outer surface of side wall 75 in the same manner as described above. Spring assemblies 91 dampen vibration between hard disk drive assembly 11 and the system docking bay.

The third component of the dampening system is a set of four dimple-like button pads 99. Each button pad 99 is mounted near a corner on the outer side of base 81 to provide additional vibration absorption between hard drive assembly 11 and the system docking bay.

In operation, a plurality of hard disk drive assemblies 71 are assembled and installed in a system docking bay (similar to those depicted in FIGS. 6 and 7). Side absorbers 87 eliminate mechanical lash and absorb vibration between hard disk drive 73 and carrier 75. The spring assemblies 91 contact the guide rails in the docking bay for additional vibration dampening. Button pads 99 FIG. 4) further dampen vibration between the assemblies 71 and the system docking bay.

The invention has several advantages. The vibration and dampening system reduces or eliminates excessive vibration created by removable hard disk drives. The dampening system is located at interfaces between the hard disk drive, carrier and docking bay, and does not alter the form factor of the HDD. The dampening system can offer EMC and ESD grounding of the HDD and the carrier. In addition, the dampening system may be fastened to the carrier or directly to the HDD.

While the invention has been shown or described in only some of its forms, it should be apparent to those skilled in the art that it is not so limited, but is susceptible to various changes without departing from the scope of the invention. For example, the dampening materials may be formed from a thin film sheet, molded or a combination thereof, and may be placed at a variety of interfaces to further reduce vibration and shock

We claim:

1. A support apparatus for supporting a storage drive in an enclosure having a docking bay for receiving the support apparatus, the support apparatus comprising:

a frame-like, structural carrier having a base and a pair of side walls extending therefrom, wherein the carrier is adapted to be rigidly mounted to the storage drive;

at least two spring clips, each associated with one of the side walls of the carrier, wherein the spring clips are adapted to be mounted between the docking bay and the side walls for absorbing vibration therebetween; and at least two dampening elements, each associated with one of the spring clips, wherein each of the dampening elements is located between at least a portion of one of the spring clips and a respective one of the side walls of the carrier for absorbing vibration therebetween.

2. The support apparatus of claim 1 wherein each of the spring clips has an absorption portion that captures one of the dampening elements against one of the side walls.

3. The support apparatus of claim 1 wherein each of the spring clips has a second portion that is spaced apart from a respective one of the dampening elements.

4. The support apparatus of claim 1 wherein the spring clips are fastenerless.

5. The support apparatus of claim 1 wherein the dampening elements are formed from a polymeric material having vibration and shock absorption properties.

6. The support apparatus of claim 1 wherein the spring clip is formed from a material selected from the group consisting of metallic materials and conductive polymer materials.

7. The support apparatus of claim 1 wherein each of the spring clips has a dimple that is adapted to contact the docking bay.

8. The support apparatus of claim 1 wherein the spring clips provide an electrostatic and electromagnetic ground interface between the storage drive, the carrier, and the docking bay of the enclosure.

9. A support apparatus for supporting a storage drive in an enclosure having a docking bay for receiving the support apparatus, the support apparatus comprising:

a carrier having a base and a pair of side walls extending therefrom for supporting the storage drive therebetween;

at least two spring clips, each associated with one of the side walls of the carrier, wherein the spring clips are adapted to be mounted between the docking bay and the side walls for absorbing vibration therebetween;

at least two dampening elements, each associated with one of the spring clips, wherein each of the dampening elements is located between at least a portion of one of the spring clips and a respective one of the side walls of the carrier for absorbing vibration therebetween; and wherein each of the spring clips has a pair of tabs that extend into and engage a respective one of the side walls to retain the spring clips and dampening elements.

10. A support apparatus for supporting a storage drive in an enclosure having a docking bay for receiving the support apparatus, the support apparatus comprising:

a carrier having a base and a pair of side walls extending therefrom for supporting the storage drive therebetween;

at least two spring clips, each associated with one of the side walls of the carrier, wherein the spring clips are adapted to be mounted between the docking bay and the side walls for absorbing vibration therebetween;

at least two dampening elements, each associated with one of the spring clips, wherein each of the dampening elements is located between at least a portion of one of the spring clips and a respective one of the side walls of the carrier for absorbing vibration therebetween; and wherein each of the side walls has an exterior with a recess therein and the spring clips are mounted in the recesses.

11. A storage drive carrier for supporting a storage drive in an enclosure having a docking bay for receiving the storage drive carrier, the storage drive carrier comprising:

a tray having a base and a pair of side walls extending therefrom for supporting the storage drive therebetween, wherein each of the side walls has an exterior with a recess therein;

a fastenerless spring clip located in each of the recesses of the side walls, wherein the spring clips are adapted to be mounted between the docking bay and the side walls for absorbing vibration therebetween; and a dampening element located adjacent to each of the spring clips, each of the dampening elements being captured between an absorption portion of one of the spring clips and a respective one of the side walls of the tray for absorbing vibration therebetween.

12. The storage drive carrier of claim 11 wherein each of the spring clips has a pair of tabs that extend into and engage a respective one of the side walls to retain the spring clips and the dampening elements in the recesses, and wherein the spring clips only make contact with the sides walls via the tabs.

13. The storage drive carrier of claim 11 wherein each of the spring clips has a central portion that is spaced apart from a respective one of the dampening elements.

14. The storage drive carrier of claim 11 wherein the dampening element is formed from a polymeric material having vibration and shock absorption properties.

15. The storage drive carrier of claim 11 wherein the spring clip is formed from a material selected from the group consisting of metallic materials and conductive polymer materials.

16. The storage drive carrier of claim 11 wherein each of the spring clips has a dimple that is adapted to contact the docking bay.

17. The storage drive carrier of claim 11 wherein the spring clips provide an electromagnetic and electrostatic ground interface between the storage drive, the tray, and the docking bay of the enclosure.

18. A storage drive carrier for supporting a storage drive in an enclosure having a docking bay for receiving the storage drive carrier, the storage drive carrier comprising:

a tray having a base and a pair of side walls extending therefrom for supporting the storage drive therebetween, wherein each of the side walls has an exterior with a recess therein;

a fastenerless spring clip located in each of the recesses of the side walls and adapted to be mounted between the docking bay and the side walls for absorbing vibration therebetween, each of the spring clips having a central portion, an absorption portion located on each side of the central portion, and a tab extending from each absorption portion, wherein the tabs extend into and engage a respective one of the side walls to retain the spring clips in the recesses, and wherein the spring clips only make contact with the side walls via the tabs; and a dampening element located adjacent to each of the spring clips, each of the dampening elements being captured between the absorption portion of one of the spring clips and a respective one of the side walls of the tray for absorbing vibration therebetween, wherein the central portions of the spring clips are spaced apart from a respective one of the dampening elements to define a gap therebetween.

19. The storage drive carrier of claim 18 wherein the dampening element is formed from a polymeric material having vibration and shock absorption properties.

20. The storage drive carrier of claim 18 wherein the spring clip is formed from a material selected from the group consisting of metallic and conductive polymer materials.

21. The storage drive carrier of claim 18 wherein each of the spring clips has a dimple that is adapted to contact the docking bay.

22. The storage drive carrier of claim 18 wherein the spring clips provide an electrostatic and electromagnetic ground interface between the storage drive, the carrier, and the docking bay of the enclosure.

* * * * *